Figure 1:
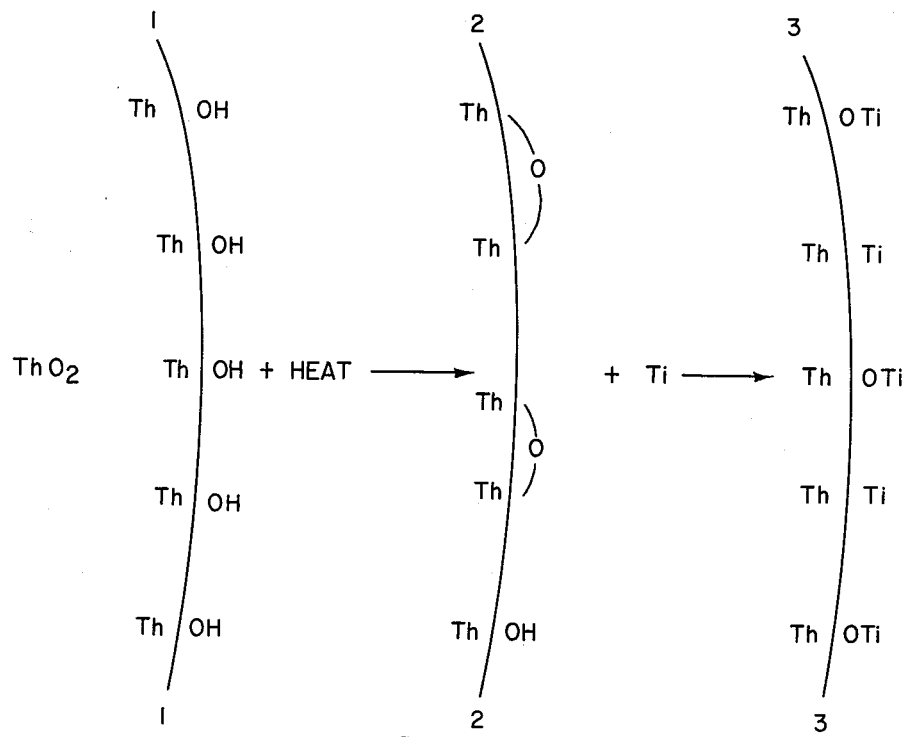

April 3, 1962   G. B. ALEXANDER ET AL   3,028,234
PROCESS FOR PRODUCING MIXTURE OF REFRACTORY
METAL OXIDES AND METAL AND PRODUCT THEREOF
Filed March 3, 1961

INVENTORS
GUY B. ALEXANDER
RALPH K. ILER
SHERWOOD F. WEST
BY
*Fred C. Carlson*, ATTORNEY

# United States Patent Office 3,028,234
Patented Apr. 3, 1962

3,028,234
PROCESS FOR PRODUCING MIXTURE OF REFRACTORY METAL OXIDES AND METAL AND PRODUCT THEREOF
Guy B. Alexander, Ralph K. Iler, and Sherwood F. West, Brandywine Hundred, Del., assignors to E. I. du Pont de Nemours and Company, Wilmington, Del., a corporation of Delaware
Filed Mar. 3, 1961, Ser. No. 93,267
12 Claims. (Cl. 75—134)

This invention is concerned with improving the tensile strength, yield strength, hardness, stress rupture, and creep resistance of metals, particularly at elevated temperatures. The improvement is accomplished by incorporating very small, dispersed particles of a refractory metal oxide into an inactive metal, mixing this dispersion with a molten metal mixture in which there is an active metal, and casting the resulting mixture.

More particularly the invention is directed to such cast metalliferous compositions comprising a dispersion, in a mixture of (a) a metal having an oxide reducible by hydrogen below 1000° C. and a free energy of formation at 27° C. below 88 kcal. per gram atom of oxygen, with (b) an active metal having an oxide irreducible by hydrogen below 1000° C. and a free energy of formation at 27° C. above 88 kcal. per gram atom of oxygen, of (c) substantially discrete particles, having an average dimension of 5 to 1000 millimicrons and a surface area, in square meters per gram, of $6/D$ to $1200/D$ where D is the density of the particles in grams per milliliter, of a refractory metal oxide which is insoluble in said metal mixture, is thermally stable at the melting point of the composition, and has a melting point above that of the composition and a free energy of formation ($\Delta F$) at 1000° C. above 60 kilocalories per gram atom of oxygen (kcal./gm. at. O) and above the $\Delta F$ of the oxide of the active metal, the proportion of active metal being at least 4 mol percent, based upon the weight of dispersed refractory oxide particles.

The invention is further particularly directed to processes for producing the novel compositions comprising the steps of mixing a powdered solid dispersion of the refractory oxide particles in an inactive metal with a molten mass of metal, there being present in the mixture at least 4 mol percent of active metal based upon the weight of refractory oxide, the intensity of mixing being sufficient to maintain dispersion of the oxide particles in a substantially discrete state in the mixture, and the temperature of mixing being high enough to melt the inactive metal of the powdered solid dispersion, and thereafter casting the molten mixture.

Figure 2:
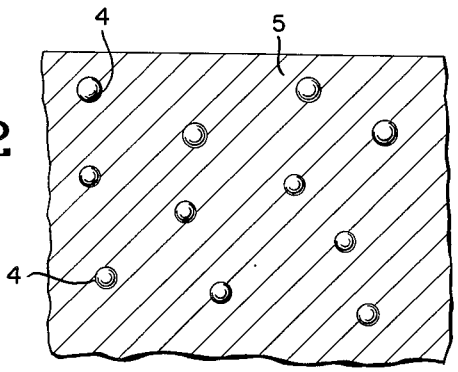

In the drawings,

FIGURE 1 is a fanciful representation of a refractory oxide particle, thoria, having a surface bonded to an active metal, titanium, the surface being metallophilic by reason of the combination therewith of titanium atoms, and FIGURE 2 is a cross section of a mass of mixed active and inactive metals containing dispersed therein a refractory oxide filler.

In prior efforts to produce metals having modified properties, particularly improved stress rupture, high-temperature tensile and yield strength, and creep resistance, it was thought that care should be used to exclude oxide occlusions. Expensive procedures have been employed for purging oxygen and oxygen compounds from molten masses of metal. More recently, in the manufacture of cermets, processes have been worked out in which, by powdered metal techniques, certain metals containing oxide coatings can be shaped as a sintered mass, and upon cooling heterogeneous masses can be obtained. In such cermets the metal oxide is present as particles which in general are substantially larger than 1 micron in size. While such cermets have found valuable applications in industry the necessity of forming them by sintering rather than by molten metal procedures renders their cost so great that they can be used only in specialty applications. Moreover, the ceramic or refractory body is not intimately bonded to the metal phase. When said products are heated to above the melting point of the metal phase, a separation occurs.

It has not hitherto been believed possible, by molten metal procedures, to produce satisfactory, high-melting metals containing dispersions of refractory materials.

It has also not hitherto been known how to bond finely divided oxides to high-melting metals, nor how to disperse them in said metals. Thus, if one merely adds a finely divided refractory metal oxide to a molten mass of such metal, the oxide sinters and coalesces to a slag of aggregated particles which cannot then be redispersed.

In the conventional cermets of the prior art relatively large oxide or refractory bodies are used. Because of this, or because bonding of the refractory to the metal has not been achieved, such products suffer from low tensile strength and brittleness—that is, the impact strength is strictly limited. The ductility of the parent metal is completely lost.

According to the present invention it has now been found that if the refractory oxide is properly selected with reference to its free energy of formation, is in the form of substantially discrete particles of a limited size range, has a ratio of surface area to density within a specific, relatively narrow range, and is embedded in an inactive metal, if also there is present in the molten metal mass to which it is added a suitable proportion of an active metal, then dispersions of refractory metal oxides are not detrimental, even when the dispersions are prepared by molten metal technology, but, on the contrary, the metal products produced are remarkably improved with respect to such properties as high-temperature tensile and yield strength, high-temperature stress rupture, hardness and creep resistance. Surprisingly, when refractories as described are introduced into certain molten metal baths the viscosity of the bath is substantially increased, so that the molten metal can be handled in a highly unorthodox manner. It can be spun into fibres, handled like putty, and even molded into formed bodies at temperatures considerably above the melting point of the metal. The utility of these remarkable changes in the properties of the metal will be readily apparent to those skilled in the art.

In the description which follows, the invention will be described with respect to particular embodiments thereof but it will be understood that the particular materials mentioned are representative only and that the invention is broadly applicable as set forth in the appended claims.

Referring again to the drawings, in FIGURE 1, line 1—1 represents the surface of the thoria particle containing surface

groups. When this surface is heated, condensation between

groups occurs with the formation of oxide linkages on the surface as shown at line 2—2 of FIGURE 1. If, while maintaining the temperature at about 720° C. this surface is subjected to contact with titanium metal under non-oxidizing conditions, there is obtained a particle having a core of thoria and a surface of titanium-thoria groups. The specific surface area, which was initially in the range of 0.6 to 120, is not changed substantially. When thoria-molybdenum powder is added to and mixed with a molten mass of an active metal containing titanium, the above reactions occur, and when the molten mass is solidified, the metal obtained has substantially increased strength. This increase is especially evident at elevated temperatures—specifically at temperatures only somewhat below the melting point of the metal.

In FIGURE 2 a dispersion of a refractory oxide in a solidified mixture of active and inactive metals is shown. Particles 4 are the refractory oxide which are distributed substantially uniformly through the mass of metal 5. It is, of course, not possible to see in such a representation the manner in which the oxide particles are bonded to the metal; however, wetting of the particle by the metal can be inferred from observation of the manner in which the refractory readily becomes dispersed and stays dispersed in the metal when the refractory is added to the the molten metal. On the other hand, refractories which are not wetted by the molten metal float on top or, in other words, make manifest the fact that they are metallophobic.

THE REFRACTORY OXIDE

In describing this invention the dispersed refractory particles will sometimes be referred to as "the filler." The word "filler" is not used to mean an inert extender or diluent; rather, it means an essential constituent of the novel compositions which contributes new and unexpected properties to the metalliferous product. Hence, the filler is an active ingredient.

The filler which is dispersed in a molten metal mixture in accordance with the present invention must have certain characteristics to give the desired effects. It must be a refractory—that is, it must not melt in the molten metal to which it is added—and in general, should have a melting point above 1000° C. It should not sinter or be soluble to any substantial degree in the metal to which it is to be added. The art is familiar with refractories generally, and one skilled in the art will have no trouble recognizing a refractory answering the above description.

One advantage of the present invention over the prior art is that hard particles of a controlled size and shape can be added to metals to reinforce their properties. If the hard particles are soluble in the metal, then recrystallization and particle growth will occur, particularly when the metal is molten. The result is that the size of the hard particles will be increased and the advantages of small particles will be lost. Filler particles which are soluble to an extent less than 0.1% by weight at 1000° C. are required. Preferred are particles which are less soluble than 0.001%.

The refractory oxide filler must be thermally stable in the molten metal to which they are added. By "thermally stable" is meant that the filler does not melt or decompose below the indicated temperature. The refractory may have a surface coating which does not answer this description, as in the case of FIGURE 1, but if so, the coating must be sufficiently thin that the refractory nature of the particles is not lost.

The ultimate particles in the filler must be in the submicron range and preferably have an average dimension in the range of 5 to 500 millimicrons. Because there is a considerable difference of density in various refractories, the size of the refractory particles is aptly defined in terms of their density and surface area per unit weight—that is, specific surface area. This also obviates the difficulties encountered when isotropic particles are involved. Specific surface area is, of course, expressed in square meters per gram (m.²/g.). The refractory particles used according to the present invention should have a specific surface area in the range of $6/D$ to $1200/D$ m.²g., where D is the density of the particles in grams per milliliter (g./ml.). In the case of spheroids, this corresponds to particles having a diameter of from 5 to 1000 millimicrons. Below 5 millimicrons, it is difficult to obtain dispersions of the particles in metals because of a tendency to sintering. Above 1000 millimicrons the effect of the finely divided refractory oxide in the metal is to produce brittleness, or development of the desired physical properties in the final metal mixture will not be achieved. Particles having a surface area in the range of $600/D$ to $24/D$ M.²/g. are especially preferred.

The surface area of any material can readily be determined from nitrogen adsorption data by the well-known method of Brunauer, Emmett and Teller.

The finely divided refractory can be in the form of either crystalline or amorphous particles. The particles can be spherical, particularly in the case of amorphous materials, or they can have specific crystalline shapes—for example, cubes, fibers, platelets, and other shapes. In the case of fibers and plate-like materials, unusual and beneficial results can be obtained due to the shape factor of the particles. For instance, fibers and platelets cause the molten metals to become very highly viscous at considerably lower volume loadings than are necessary with spheroids or cubes. On the other hand, to lower the density of a metal like tungsten, one uses a high-volume loading of a low-density filler such as alumina particles.

When the size of a particle is given in terms of a single figure, this refers to an average dimension. For spherical particles this presents no problem, but with anisotropic particles the size is considered to be one third of the sum of the three particle dimenions. For example, a fiber of alumina might be 500 millimicrons long but only 10 millimicrons wide and thick. The size of this particle would be $$\frac{500+10+10}{3}$$

or 173 millimicrons, and hence within the limits of this invention.

The refractory particles must be dispersible in the molten metal mixtures. Dispersibility is a function of two properties, namely, the surface character of the particles and their geometry. The surface character giving dispersible particles is present when the refractory particles are subjected to contact with an active metal. Wettability can be assumed, if, when a quantity of the refractory is added to a molten mass of the metal, it mixes with and remains dispersed in the metal. In this event the refractory is said to be wettable or metallophilic.

The geometry of the particles involves their size, shape, and packing density. The particles can be discrete, individual particles in the submicron range, or they can be aggregates of small ultimate particles. Thus, for instance, in the case of thoria, aggregates up to 500 millimicrons in size can be made up of ultimate spheroidal particles—say 17 millimicrons in diameter. Aggregates even larger than 1000 millimicrons can be used, the important consideration being the ease with which ultimate particles less than 1000 millimicrons in size are formed from the aggregates in the molten mixture.

The aggregates can, for instance, be reticulated spheroids. Upon addition of such reticulated particles to molten metal and subjecting the mass to shear, the reticulated particles can be broken down into individual spheroids but the spheroids are still wet by the metal. Thus, the refractory materials added to the molten metal need not be in the form of discrete particles, provided they are dispersible to particles of a character as herein described, by such action as shearing.

The ease with which aggregates can be dispersed is indicated by their degree of coalescence and packing density. For instance, a very highly coalesced, densely packed aggregate might not readily disperse as desired, whereas a loosely packed material having a low degree of coalescence might quite readily disperse.

It has been found, according to the present invention that particulate refractory oxides, many of which are relatively inexpensive and readily available in the necessary finely divided form, can be wetted into molten metals if an active metal is present in sufficient proportion. The oxide, to be suitable, should be relatively non-reducible—that is, an oxide which is not reduced to the corresponding metal by hydrogen at temperatures below 1000° C. or by the metal in which it is embedded. Such fillers have a free energy of formation at 1000° C. of more than 60 kcal./gm. at. O.

Mixed oxides can be used as fillers, particularly those in which each oxide in the mixed oxide conforms to the melting point and free energy of formation requirements above stated. Thus, magnesium aluminate, $Mg(AlO_2)_2$, is considered as a mixed oxide of MgO and $Al_2O_3$. Each of these oxides can be used separately; also, their products of reaction with each other are useful. By "dispersion of an oxide" is meant a dispersion containing a single metal oxide or a reaction product obtained by combining two or more metal oxides. Also, two or more separate oxides can be included in the products of the invention. The term "metal oxide filler" broadly includes spinels, such as $MgAl_2O_4$ and $CaAl_2O_4$, metal aluminates, and metal zirconates.

Colloidal metal oxide aquasols are particularly useful as a means of providing the fillers in the desired finely divided form, and hence are preferred. Zirconia sols are useful as starting materials. Such sols as described by Weiser in Inorganic Colloidal Chemistry, volume 2, "Hydrous Oxides and Hydroxides," can, for example, also be used. Particularly preferred are thoria sols prepared by calcining thorium oxalate and dispersing the resulting solid in dilute acid.

Typical single oxides which are useful as the filler include alumina, zirconia, magnesia, hafnia, and the rare earth oxides including thoria. A typical group of suitable oxides, and their free energies of formation is shown in the following table.

| Oxide | $\Delta F$ at 1,000° C. | Oxide | $\Delta F$ at 1,000° C. |
|---|---|---|---|
| $Y_2O_3$ | 125 | $ZrO_2$ | 100 |
| CaO | 122 | BaO | 97 |
| $La_2O_3$ | 121 | $ZrSiO_4$ | 95 |
| BeO | 120 | TiO | 95 |
| $ThO_2$ | 119 | $TiO_2$ | 85 |
| MgO | 112 | $SiO_2$ | 78 |
| $UO_2$ | 105 | $Ta_2O_5$ | 75 |
| $HfO_2$ | 105 | $V_2O_3$ | 74 |
| $CeO_2$ | 105 | $NbO_2$ | 70 |
| $Al_2O_3$ | 104 | $Cr_2O_3$ | 62 |

In attempts to add submicron oxide particles directly to molten metals having melting points above 720° C., it is found that the oxide particles sinter and coalesce to such an extent that the very fine particle size is lost. Thus, it is not possible to add oxide particles directly to a molten high metal and obtain a dispersion of submicron particles in the metal. In the present invention, this problem is overcome by first embedding the refractory oxide particle in an inactive metal, i.e., one which has an oxide which can be reduced to metal with hydrogen, and then adding this mastermix or masterbatch, in the form of a powdered solid dispersion, to molten metal. The details of such a procedure are described hereinafter.

THE ACTIVE METAL

Although the described oxides are useful as fillers in the processes of this invention, oxides per se are not wetted by metals having an oxide reducible by hydrogen below 1000° C. and a $\Delta F$ at 27° C. below 88 kcal./gm. atom of oxygen. Hence, the surface at the interface requires modification before such oxides can be useful. This is accomplished by having present an active metal.

The observed results of having the active metal present can be explained on the basis that the active metal reacts with the surface of the refractory oxide particles, thereby leaving them with a coating which is in a reduced valence state. With the most active metals, the process may merely involve a reaction of the metal with the surface of the oxide particle. However, with active metals of lesser activity, and particularly those which are incapable of reducing the oxide, a limited amount of oxygen is helpful in developing a metallophilic coating.

For purposes of the present invention, an active metal is defined as one having an oxide irreducible by hydrogen below 1000° C. and a $\Delta F$ at 27° C. greater than 88 kcal./gm. atom of oxygen. This category includes beryllium, magnesium, aluminum, silicon, vanadium, titanium, tantalum, yttrium, zirconium, hafnium, niobium, the rare earth metals, lithium, sodium, calcium, barium, and strontium. It will be noted that these elements stand above iron in the electromotive series.

In compositions containing a major proportion of active metal there is a correlation between the particular refractory oxide filler and the active metal to be used with it, in that the free energy of formation of 1000° C. of the refractory oxide should be greater than the corresponding free energy of formation of the oxide of the active metal. For example, $\Delta F$ for calcium oxide is 122 whereas aluminum oxide has a $\Delta F$ of 104; hence calcium oxide is a suitable refractory for dispersion in metal mixtures containing aluminum.

When an active metal is used for modifying the surface of a refractory oxide core particle to make it metal-wettable and more readily dispersible, the active metal can reduce the oxide to one in which the metallic element combined with the oxygen is in a lower valence state, the lower oxide being more readily wettable. Alternatively, the active metal can form a surface coating around the core of the refractory oxide. The coating can also consist of a layer of lower oxide, upon the outside of which there is a layer of the active metal.

The amount of active metal required to act as a reducing agent to reduce the surface of a refractory core is relatively small, on the molar basis, as compared to the total number of moles of material in the refractory or ceramic-like body under treatment. In general, from 4 to 20 mole percent is usually sufficient; however, the amount required will vary directly with the surface area, and in the case where a finely divided, very high surface area material is used, this will require proportionally more of the active metal than when a relatively large particle is treated. In any event, one does not completely reduce the refractory body, but the proportion of active metal can, of course, be substantially more than the minimum required amount.

From a knowledge of the ultimate particle size or of the surface area and density of a given refractory body, one can calculate the mol percentage of the refractory oxide which is on the surface of the particle. From such a calculation, one can then determine the amount of active metal required as a reducing agent. It is preferred to use at least as much active metal as a reducing agent as would be required for coverage of the refractory particles to a thickness of 2 to 10 molecular layers or somewhat more.

THE INACTIVE METAL, HAVING REDUCIBLE OXIDE

The metal with which the active metal and refractory oxide is mixed in compositions of this invention should have a melting point above 50° C., so that it is capable of being cast at room temperature, an oxide reducible with hydrogen below 1000° C., and a $\Delta F$ at 27° C. less than 88 kcal./gm. atom of oxygen. Mercury, having a melting point below 50° C., is unsuitable, since it has no utility as a material of construction.

This category of "inactive" metals consists of iron, cobalt, nickel, molybdenum, tungsten, chromium, copper, silver, gold, cadmium, lead, tin, bismuth, and indium. Generally, they are metals which are used as materials of construction or as constituents of alloys used for this purpose. Because of their utility in alloys for service at high temperatures, cobalt, nickel, molybdenum and tungsten are a preferred group of inactive metals.

SURROUNDING THE REFRACTORY OXIDE WITH INACTIVE METAL

In carrying out a process of this invention, having selected a refractory oxide filler, an inactive metal, and an active metal as above described, one surrounds the filler particles with the inactive metal and then dilutes the inactive metal with an active metal while maintaining the filler as separate particles.

The method used for surrounding the refractory oxide particles with inactive metal must be one which will not cause the particles to aglomerate or to grow to a size outside the stated range. With high-melting inactive metals such as iron, cobalt, nickel, molybdenum, chromium, and tungsten this poses a problem, particularly with any but the most refractory of fillers. Accordingly, in a preferred aspect of the invention the inactive metal-filler concentrate is prepared by precipitating a compound of the metal, in which the metal is in an oxidized state, in contact with the dispersed filler particles, and then reducing the metal compound to the corresponding metal, as by treating it, after drying, with hydrogen at elevated temperature.

The precipitated compound of the inactive metal can be the oxide, hydroxide, hydrous oxide, oxycarbonate, or hydroxycarbonate. Since these compounds, as precipitated, usually contain varying amounts of water, they can be referred to generally as hydrous, oxygen-containing compounds of the metal.

The precipitated inactive metal compound can be one of a single metal or of two or more metals. For example, the hydrous oxides of both nickel and cobalt can be deposited around a filler. In the latter case, an alloy of cobalt and nickel is produced directly, during the reduction step. In similar manner, alloys of iron, cobalt or nickel, for example, can be prepared with other metals which form hydrogen-reducible, hydrous, oxygen-containing compounds. Thus, alloys with copper, molybdenum, tungsten, and rhenium can be prepared by codepositing two or more oxides of the selected metals on the filler particles.

The hydrous, oxygen-containing compound can be precipitated from solutions in which it is present as the corresponding soluble salt. Preferably, the salt is a metal nitrate, although metal chlorides, sulfates, and acetates can be used. Ferric nitrate, cobalt nitrate, nickel nitrate, ammonium molybdate, and sodium tungstate are among the preferred starting materials.

Methods for precipitating oxygen-containing metal compounds from solutions of the corresponding metal salts are well known in the art and any such method can be used. For instance, an alkali can be added to a solution of the metal nitrate. When, on the other hand, the metal is in the form of a basic salt, such as sodium molybdate, precipitation can be effected by acidifying.

A preferred method for surrounding the filler particles with the oxygen-containing compound of inactive metal is to coprecipitate the filler particles from a colloidal aquasol simultaneously with the precipitation of the inactive metal compound. One convenient way to do this is to add, simultaneously but separately, a solution of the soluble metal salt, a colloidal aquasol containing the filler particles, and an alkali such as sodium hydroxide, to a heel of water. Alternatively, a dispersion containing the filler particles can be used as a heel and the metal salt solution and alkali added simultaneously but separately thereto.

During such a coprecipitation process certain precautions are preferably observed. It is preferred not to coagulate or gel the filler particles. Coagulation and gelation are avoided by working in dilute solutions, or by simultaneously adding the filler and the metal salt solution to a heel.

The filler particles should be completely surrounded with the precipitated, reducible inactive metal compound, so that when reduction occurs later in the process, aggregation and coalescence of the filler particles is avoided. In other words, the particles of the filler are discrete and not in contact, one with another, in the coprecipitated product. Vigorous mixing and agitation during the coprecipitation helps to insure the desired result.

After depositing the insoluble inactive metal compound on the filler, any salts present are removed, as by washing. When one uses an alkali such as sodium hydroxide, potassium hydroxide, lithium hydroxide, ammonium hydroxide, or tetramethylammonium hydroxide to effect precipitation, salts such ase sodium nitrate, ammonium nitrate or potassium nitrate are formed. These should be removed. One of the advantages of using the nitrate salts in combination with aqueous ammonia is that ammonium nitrate is volatile and therefore is easily removed from the product. However, the tendency of many metals, such as cobalt and nickel, to form amine complexes is a complicating reaction in this case. By carefully controlling the pH during coprecipitation, these side reactions can be avoided.

A very practical way to remove salts is by filtering off the precipitate and washing it on the filter or repulping the filter cake and again filtering.

After removing soluble salts the product is dried, preferably at ultimate temperatures above 100° C. Alternatively, the product can be dried, and the dry material suspended in water to remove the soluble salts, and the product thereafter redried.

The relative amount of insoluble inactive metal compound deposited upon the filler particles can be varied over wide limits. Volume loadings at high as 50%, that is, one volume of oxide for each volume of metal present, can be successfully used, but such products are often pyrophoric. Even heating to 1000° C. after reduction does not completely eliminate this problem.

The pyrophoric tendency is minimized as the volume loading is decreased. In the range of 40 to 50 volume percent of filler, it is advisable to protect the modified metal in an inert atmosphere (hydrogen, argon or helium) until the material is used in the casting process. At 30 volume percent, one can usually sinter the modified metal mass sufficiently that it can be handled in air, prior to its addition to molten metal.

The amount of precipitated inactive metal compound which it is desired to deposit upon the filler will vary somewhat with the particle size of the filler and especially with its surface area. Thus, with the smaller sizes of filler particles, having surface areas greater than $200/D$ m.$^2$/g., D being the density of the filler in g./ml., volume loadings of from 0.5 to 5% are preferred. With relatively large particles—those, for example, in the size range of 100 millimicrons—one can use volume loadings near the upper end of the ranges above mentioned.

Having deposited on the filler particles the precipitate of compound of inactive metal in the oxidized state, and washed and dried the product, the next step is to reduce the inactive metal compound to the metal. This can be done conveniently by subjecting the coated particles to a stream of hydrogen at a somewhat elevated temperature. The temperature throughout the entire mass must not be allowed to exceed the sintering temperature of the filler particles. One way to accomplish this is to place the product in a furnace at a controlled temperature and add hydrogen gas slowly; in this way, the reduction will not proceed so rapidly that large amounts of heat are liberated causing the temperature to get out of control.

The hydrogen used in the reduction can be diluted with an inert gas such as argon to reduce the rate of reaction and avoid "hot spots." In this way the heat of reaction is carried away in the gas stream. Alternatively, the temperature in the furnace can be slowly raised into the range of 500 to 1000° C. while maintaining a flow of hydrogen over the product to be reduced.

In addition to or instead of hydrogen, other reducing gases such as carbon monoxide, or methane and other hydrocarbon gases, can be used as the reducing agent. In any case, it is important to control the temperature during reduction, not only to avoid premature sintering as above mentioned, but also so that excessive reaction will not occur between the reducible inactive metal compound and the filler oxide prior to complete reduction of the inactive metal compound.

Reduction should be continued until the inactive metal compound is essentially completely reduced. When reduction is nearing completion, it is preferred to raise the temperature to the range between 700 and 1300° C. to complete the reaction, but care must be taken not to exceed the melting point of the reduced metal. During the reduction process very fine metal grains are formed. These tend to fuse and grow but their ultimate size is restricted because of the presence of the filler particles. Thus, the size of grains obtained in this way is usually less than 10 microns.

Reduction should be carried out until the oxygen content of the mass is substantially reduced to zero, exclusive of the amount of oxygen originally introduced in the form of the oxide filler material. In any case, the oxygen content of the product, exclusive of the oxygen originally introduced in chemically combined form in the filler, should be in the range from 0 to 0.5% and preferably from 0 to 0.1%, based on the weight of the product.

The analysis for oxygen can be done by many methods with which the art is familiar, one such method being vacuum fusion as described by R. A. Yeaton in Vacuum, volume 2, No. 2, page 115, "The Vacuum Fusion Technique as Applied to Analysis of Gases in Metals."

Oxygen, other than that combined with the filler, may interfere with the function of the active metal, by reacting with the active metal to yield active metal oxide. For this reason the oxygen level should be maintained in the range above stated until after mixing with the molten, active metal is complete.

After the reduction reaction is complete, the resulting powder is sometimes pyrophoric. Therefore, it is preferred to cool the mass and maintain it in an inert atmosphere until it has been sintered to a surface area of 2 m.$^2$/g. or less, or until it has been diluted with the active metal and used in the casting process.

THE PROPORTION OF ACTIVE METAL

In compositions of this invention the active metal is present in at least the minimum proportion which prevents drossing out of the refractory oxide when the composition is maintained in a quiescent molten state for one-half hour. A proportion of at least 4 mol percent, based on the refractory oxide, accomplishes this result. According to the present invention it has been found that "drossing" out or "slagging" out is a measure of lack of bonding of the metal matrix to the dispersed refractory oxide particles. A molten mixture containing refractory oxide can be vigorously agitated or intensively mixed to such a degree that the oxide appears to be homogeneously dispersed. However, if there is insufficient active metal to give the desired improved bonding in the final product, this fact can be readily ascertained by permitting the molten mixture to stand quiescent for one-half hour. If any substantial amount of the refractory oxide floats to the top or settles to the bottom the proportion of active metal is inadequate and should be increased.

The presence or absence of drossing out can readily be determined by freezing a sample, after one-half hour of quiescent standing as a molten mixture, to form an ingot, and examining its homogeneity of composition.

The homogeneity of distribution of the refractory oxide particles can easily be ascertained by ordinary procedures of mechanical sampling and analysis. Sections of the solid metal ingot just described are taken from the outer portions, from the center, and from the top, the bottom, and the middle, in such a manner as to give samples of the composition from all of the several areas of the ingot. These samples are obtained by ordinary metal working procedures, such as sawing or chiseling. The samples are then analyzed by chemical methods, by metallographic examination (such as by light and electron microscopes), by a measurement of the conductivity of the metallic phase, by a determination of density, or by radiotracer techniques, in the event that the filler particles are radioactive (e.g., thoria or uranium oxide), or by any suitable procedure for determining the chemical composition of a system.

Products of this invention in which no drossing out of filler particles has occurred are characterized by having substantially the same chemical compositions in each portion of the cast ingot. If extensive phase separation has occurred, areas from the oxide-rich portion of the ingot will analyze very much higher in the chemical constituents of the oxide than areas taken from other portions of the ingot. If the oxide concentration in any single major area of the ingot is more than 50% greater than that in any other major area, drossing out is considered to have occurred.

PROCESSES OF THE INVENTION

Processes of this invention comprise the steps of mixing a powdered solid dispersion of the refractory oxide particles in an inactive metal having an oxide which is reducible by hydrogen below 1000° C., and a $\Delta F$ at 27° C. below 88 kcal./gm. atom of oxygen, with molten metal, the mixing being carried out while there is present at least enough active metal to prevent drossing out of the refractory, and casting the molten mixture. While the processes are peculiarly adapted to incorporating dispersed refractory oxide particles into metals having a melting point above 720° C., they are also useful for dispersing such particles in lower-melting metals.

It is important to carry out the foregoing mixing in an inert atmosphere to prevent excessive oxidation of the active metal. Argon is particularly suitable.

In one aspect of the invention, homogeneous mixing of the refractory oxide with the molten metals is facilitated by having present a limited amount of oxygen. This causes the refractory oxide to wet into the metal mixture more readily, apparently by depositing a coating of compounds of the metals in a reduced valence state on the surface of the refractory particles. Thus, an oxide refractory can be coated with an oxide of a metal, this coating being in a reduced valence state. By a "reduced valence state," we mean that the ratio of the metal to oxygen in the coating is substantially greater than the ratio of metal to oxygen which is normally found in the stable oxide compounds of said metal. In other words, an excess of metal is present in the coating.

In this manner, powdered dispersions, in inactive metals, of finely divided oxides such as alumina, zirconia, magnesia, thoria, and the like, can be mixed with molten metals such as niobium, tantalum, titanium, rare earth metals, silicon, or aluminum, or mixtures of metals, such as niobium and titanium, optionally in the presence of a limited amount of oxygen.

As the final step in a process of this invention the refractory oxide-filled molten metal is cast—that is, it is

PRODUCTS HAVING HIGH DISPERSED OXIDE CONTENT

It is possible to prepare rather concentrated dispersions of oxides in metals according to this invention. Thus, volume loadings up to about 30% of an oxide refractory in a molten metal can be achieved. The loading which can be obtained in any system will vary with the density of the refractory and metal, and the surface area and state of aggregation of the refractory. Ordinarily, for final use, one will want to have final compositions containing less than 10% refractory. In actual practice, this can be achieved by preparing a masterbatch of an oxide refractory in a mixture of active and inactive metal, and later diluting this with additional metal or alloy to prepare the final composition. (The term "masterbatching" is commonly used in the field of polymer science and elastomers, and by it is meant a concentrate which can be later diluted and used.)

In the process as above described, one obtains best results with refractory oxides which are smaller than about one-fourth micron, and, specifically, the surface range which is preferred is from $24/D$ to $600/D$ m.$^2$/g., where D is the density of the core of the refractory being used. Particles smaller than this are difficult to handle and to wet. Moreover, they tend to sinter or fuse to non-dispersible masses during the process of incorporation into the molten metal, and hence should only be used if care is exercised to avoid temperatures at which fusion or sintering occurs. With larger particles, i.e., those having a surface area less than $24/D$ m.$^2$/g., the benefits obtained relating to the strength of metals are considerably less than those obtained with the smaller particles.

THE METAL PRODUCTS

Metals modified by having dispersed therein finely divided, wetted refractory particles as above described have remarkably improved properties. The high-temperature strength is increased, and at the same time the impact strength and ability to resist stress rupture is increased. The structural metals are thus given enhanced utility, especially in such high-temperature uses as in turbine blades, boiler tubes, and the like.

The importance of particle size is evident when one considers the balance of properties which can only be obtained with very small particles. Thus, one can reduce creep in metal systems by the conventional cermet, which is a combination of metal with refractory, in which the refractory is present as large particles. However, in such systems, the ductility and impact strength is largely lost. Now according to this invention, it is possible to reduce creep, and at the same time maintain ductility and impact strength to a considerable degree.

The character of the dispersion of refractory oxide particles in the metal products can be demonstrated using electron microscope and replica techniques wherein the surface of a metal piece is polished, a carbon layer is deposited on the polished surface, and the metal is removed, as by dissolving in acid. An electron micrograph of the remaining carbon film shows the nature of distribution and degree of aggregation of the refractory oxide particles in the metal.

Another property of products of this invention is corrosion resistance. In the conventional oxide cermets, corrosion resistance, particularly oxidation resistance at elevated temperatures is poor. It has now been found that in the case of the products of this invention, in which small particles are introduced into and wetted by the continuous metal phase, there is little or no sacrifice in corrosion resistance, and in some instances, corrosion resistance is improved.

EXAMPLES

The invention will be better understood by reference to the following illustrative examples:

Example 1

This example describes the application of a process of the invention to the preparation of an alloy of copper and aluminum containing 0.7 volume percent of alumina ($Al_2O_3$) in the form of a colloidal dispersion.

The first step in the preparation of this alloy was to prepare a dispersion of colloidal alumina in copper metal. This was done by diluting 652 parts by weight of a 5% solution of colloidal alumina monohydrate fibrils having a specific surface area of about 300 m.$^2$/g., and a fiber length of about 250 millimicrons, to a total volume of 5 liters with distilled water. Separately, 2370 grams of copper nitrate trihydrate was dissolved in 5 liters of distilled water, and 3600 cc. of a 5 N ammonium hydroxide solution was diluted to a volume of 5 liters. These three solutions were run simultaneously and at equal rates into the mixing zone of a reactor equipped with a high-speed stirrer. By means of this technique, the colloidal alumina was evenly dispersed throughout a matrix of copper hydroxide.

The precipitated copper hydroxide containing the dispersed colloidal alumina was filtered, washed, and reduced in a tube furnace with hydrogen, until substantially all of the oxygen was eliminated. Analysis of the resulting reduced metal powder containing dispersed colloidal alumina within it showed that the sample consisted of 88.7% copper and 9.7% $Al_2O_3$; this corresponding to a loading of 19.6% $Al_2O_3$ in copper by volume.

A portion of this material was dissolved in acid and electron micrographs were run on the resulting solution after dialyzing out the acids and salt left by the dissolution of the copper. The electron micrographs showed that the particles were still of colloidal size, and a nitrogen surface area run on some dry powder recovered by this technique indicated that the mean particle diameter was about 30 millimicrons.

This copper powder was used to prepare a copper-aluminum alloy which had the composition of the commercial alloy known as 24S alloy. This alloy has 4.5 parts of copper, 1.5 parts of magnesium, .6 part of manganese, and 93.4 parts of aluminum. The experimental alloy was of identical composition, except for the alumina contained inside the copper powder.

The metal components of this alloy were melted and brought to a temperature of 815° C. and maintained in the molten state for a period of thirty minutes. The mixture was then air-quenched and extruded into rods approximately one-fourth inch in diameter, from an initial size of one inch diameter. This extrusion was accomplished at a temperature of about 450° C. The alloy was then given a solution heat treatment in the temperature range of from 488° to 499° C. for a period of three hours. It was then quenched in cold water and precipitation-hardened at room temperature over a period of three days. This cycle of heat treatment corresponds to the so-called T–4 condition.

Then tensile strength of this alloy was tested at a temperature of 600° F. and was shown to be 24,000 p.s.i. A commercial alloy of the same composition but containing no alumina has a tensile strength of about 7,000 p.s.i. at this temperature. This example shows the considerable improvement in tensile strength which can be brought about by the inclusion of only 0.7 volume percent of a colloidal aluimna in an aluminum-copper alloy.

The example illustrates the technique of forming a colloidal oxide dispersion in a high-melting metal and dissolving this high-melting metal in a lower-melting metal containing an active metal as a wetting agent. In this example, the active metals were magnesium, aluminum, and manganese, and the high-melting, inactive metal was copper.

*Example 2*

A procedure substantially identical with that of Example 1 was employed to introduce 0.6 volume percent of colloidal alumina into an alloy comprising 90 parts of aluminum, 10 parts of copper, and 4 parts of magnesium.

The tensile strength of this alloy tested at 660° F. was 7100 p.s.i., and this compares with a tensile strength of 2,120 p.s.i. on an otherwise identical control alloy prepared in a similar manner except containing no colloidal alumina. This 300% improvement in the tensile strength of an alloy again illustrates the profound strengthening action of colloidally dispersed refractory oxides on metals and alloys.

*Example 3*

This example illustrates the application of a process of the invention to the preparation of a novel, high-melting metal product containing a dispersed refractory oxide.

A masterbatch of molybdenum containing 3% by weight colloidal zirconia was prepared by precipitating molybdenum pentoxide around the surface of the colloidal zirconia particles by adding ammonium hydroxide to an aqueous solution of the molybdenum pentavalent chloride. This material was then dried and reduced under hydrogen for a period of ten hours at a temperature of 1000° C.

The product was dissolved in molten titanium at the melting point of titanium, in an arc furnace in which the sample was resting on water-cooled copper supports. The ratio of molybdenum to titanium used was 30:70. This sample was remelted several times to insure complete homogenization of the alloy. The alloy was then rolled to break down the cast structure, and its high-temperature properties evaluated.

The product showed significant improvement in high-temperature creep resistance over a control alloy of otherwise identical composition, but containing no colloidal zirconia.

*Example 4*

This example describes a niobium base alloy containing submicron-sized thoria particles. This alloy is typical of a preferred class of products of the invention, namely those containing upward of 50 weight percent niobium. Such niobium base alloys can, in addition, contain up to 15% titanium, up to 20% of molybdenum, and up to 35% tungsten, the total of these additional elements being less than 50%. More specifically, the process of this example can be used to prepare such alloys as 64Nb—10Ti—6Mo—20W, 57Nb—10Ti—3Mo—30W, 60Nb—10Ti—30W. Other niobium base alloys may be prepared containing zirconium, for example, 80Nb—5Zr—15W and 85Nb—5Zr—10Mo.

In the preparation of the melted and cast composition of this example, the thoria was added to the alloy via a molybdenum-thoria masterbatch. It will be understood that a tungsten-metal oxide masterbatch can be used in addition to or in place of a molybdenum-metal oxide masterbatch in preparing alloys containing tungsten.

The thoria sol used to prepare the masterbatch was made by dispersing calcined thorium oxalate, $Th(C_2O_4)_2$, in water containing a trace of nitric acid, the thorium oxalate having been precipitated from thorium nitrate. The precipitate was washed, dried at 650° C. for two hours, slurried in 6 N $HNO_3$ for two hours, centrifuged, the precipitate reslurried in water, recentrifuged and finally slurried in water with sufficient anion-exchange resin in the hydroxyl form to raise the pH to 3.5. The resulting product was a thoria sol containing 25 millimicron, discrete thoria particles.

This thoria colloidal product was next embedded in a matrix of molybdenum hydroxide. The reactor used to accomplish this consisted of an acid-resistant steel tank with a conical bottom. The bottom of the tank was attached to acid-resistant piping, to which were attached three inlet pipes through T's. The piping was attached to a circulating pump, and from the pump the line was returned to the tank. Initially, the tank was charged with 5 liters of water. The atmosphere in the tank was nitrogen.

Through the first T, 5 liters of $MoCl_5$ solution (2732 grams $MoCl_5$ containing the equivalent of 960 grams Mo metal) was added; through the second, 5 liters of 15 molar $NH_4OH$ solution; and through the third, 5 liters of $ThO_2$ sol containing 70.9 grams $ThO_2$. The particles in the $ThO_2$ sol were 25 millimicrons in diameter, dense and discrete.

The solutions were added to the reactor simultaneously. The rate of addition was held constant and uniform over the forty-five-minute period required for total addition. The pH of the slurry at the end of the reaction was 8.7. A nitrogen atmosphere was maintained over the slurry during the reaction.

By adding equal volumes of $MoCl_5$ solution, $NH_4OH$ solution and $ThO_2$ sol during any given time interval of the reaction, the ratio of $ThO_2$ to $MoO(OH)_3$ in each fraction of precipitate was held constant.

The precipitate was recovered by filtration under a blanket of nitrogen gas. It was a brown, gelatinous mass of $MoO(OH)_3$ with 25 millimicron $ThO_2$ particles embedded uniformly throughout it.

The precipitate was dried at 240° C. overnight, micropulverized to 100 mesh and finally heated at 450° C. for two hours to remove the last traces of chloride.

The resulting black powder was placed in a furnace. The temperature in the furnace was slowly raised to 600° C., while a steady stream of purified hydrogen and argon was passed over the powder. Next the temperature was raised to 950° C. for sixteen hours and finally to 1300° C. for eight hours. During the latter stages of reduction, purified hydrogen gas was passed over the Mo—$ThO_2$ powder.

The resulting product was a powder consisting of molybdenum metal particles having 100 millimicron thoria particles dispersed throughout. The particles of powder were —100 and +200 mesh.

The nature of the thoria particles in the powder was determined by dissolving the metal in a mixture of nitric and hydrochloric acids, and recovering the colloidal $ThO_2$ by centrifuging, washing with dilute $NH_4OH$, and with $H_2O$, and finally peptizing with dilute $HNO_3$. The thoria particles appeared discrete, spherical, and 100 millimicrons in size when viewed at 25,000 magnification with an electron microscope.

The product analyzed as follows: 91.5% molybdenum by weight, 7.63% thoria (or 7.85% $ThO_2$ by volume), and 1.30% total oxygen, or only 0.37% oxygen in excess of that in the refractory oxide.

Using the molybenum-thoria masterbatch prepared as above, a niobium base alloy was made, using the following casting technique.

A granular mixture of 80% by weight niobium (99.7% pure), 10% by weight titanium (99.5% pure), and 10% by weight of molybdenum-thoria (prepared as above indicated) was non-consumably arc-melted on a water-cooled copper hearth in a clean argon atmosphere. The as-cast button of filled alloy thus prepared was forged at 1100° C. to about 50% reduction in thickness; pieces of the forged alloy were then heat treated for nine hours at 2000° C. in vacuum and rapidly cooled to room temperature. During the heat treatment at 2000° C., the grain size of the alloy reached a magnitude described by approximately ASTM Grain Size No. 4. An alloy of similar composition but containing no $ThO_2$ exhibited a grain size greater than ASTM No. —3 after similar processing. Therefore, the presence of $ThO_2$ as introduced by the present technique caused considerable restraint of grain growth during exposure of the alloy at high temperature.

Another portion of the alloy, after forging to a 50% reduction in thickness, was heated for one hour at 1100° C., a treatment sufficient to cause recrystallization of an alloy of the same composition but containing no refractory oxide particles. No metallographic evidence of recrystallization was seen in the alloy containing refractory oxide particles. Upon heating of a forged sample for six hours at 1100° C., partial recrystallization occurred. Therefore, the presence of refractory oxide particles retarded recrystallization of a cold-worked alloy.

Still another portion of the alloy, after forging, was heat treated nine hours at 2000° C., cooled to room temperature, reheated to 1200° C. and held at 1200° C. for twelve hours, cooled to room temperature and machined into specimens suitable for hot hardness testing. Diamond pyramid hardness numbers (DPHN) so obtained were as follows: (a) at 900° C. DPHN was 220, (b) 1000° C. was 190, (c) 1100° C. was 145, (d) 1200° C. was 90, (e) 1300° C. was 56, and (f) 1400° C. was 40. In general, the hardness numbers were at least twice as high as those for a control alloy containing no thoria.

In preparing compositions of the type above described, care must be exercised in the melting process. For example, if the arc is focused on the molybdenum-thoria masterbatch for prolonged periods, the thoria may slag and melt. In order to avoid this, the metal powders are thoroughly mixed prior to melting. In another approach, the molybdenum-thoria is added to molten titanium. In such systems, wetting appears to be more rapid, thus protecting the thoria from prolonged, direct exposure to the arc. A molybdenum-thoria-titanium composition is then added to molten niobium along with other alloying constituents to prepare the desired final composition.

*Example 5*

This example is similar to Example 4, except that a molybdenum-7% zirconia masterbatch was used in place of molybdenum-thoria. After heat treatment as described in Example 6, this product showed a grain size of approximately ASTM No. 0. Therefore, the pressure of the $ZrO_2$ caused restraint of grain growth during exposure of the alloy at high temperature.

A portion of the forged alloy was heat treated and hot hardness tested as in Example 6. Hardness data were: DPHN at 1000° C. of 190, at 1100° C. of 175, at 1200° C. of 120, at 1300° C. of 70 and at 1400° C. of 45.

*Example 6*

Titanium base alloys of the type Ti—2–30Mo—0–10Al can also be made by the process of this invention. Other constituents such as chromium, vanadium, and tungsten can also be present up to 15%. For example: 15 grams of a molybdenum-20% thoria masterbatch was powder blended with 264 grams of high-purity titanium powder. This mixture was arc-melted along with 21 grams of pure aluminum to form an alloy consisting of Ti—7Al—4Mo—1ThO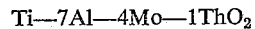$_2$ The thoria remained small and well dispersed throughout the alloy and did not slag.

*Example 7*

This example relates to modification of a zinc-cadmium alloy in accordance with the invention. Calcium metal is used as a reducing agent to effect wettability of a finely divided silica powder in the alloy.

A silica aquasol, prepared according to Bechtold and Snyder United States Patent 2,574,902, was deionized with ion-exchange resins and dried to a fine powder. This powder had a surface area of 30 m.²/g., a density of 2 g./ml., and a particle size of approximately 100 millimicrons. The powder was dried at a temperature of 110° C. in an oven. The resulting powder had a coalescence factor, determined as in U.S. Patent 2,731,326, column 12, 1.24 et seq., of 1.4%.

A zinc-cadmium alloy, composed of 82.5% cadmium and 17.5% zinc by weight, was placed in a dry-box containing an argon atmosphere. To this zinc-cadmium alloy was added 1% by weight of calcium metal. The resulting material was heated to a temperature of about 450° C. To this molten metal, the fine silica powder was added. The resulting metal-silica was mulled in a mortar with a pestle, whereupon the silica was readily wetted into the molten zinc-cadmium alloy.

The composition produced was a metal containing dispersed therein 5% silica. The molten mixture, upon quiescent standing for ½ hour, showed substantially no drossing out of the silica. This material was then cooled to solidify it. The silica remained dispersed in the metal.

*Example 8*

To 100 g. of a molten alloy of cadmium and zinc (82.5% Cd, 17.5% Zn) in a crucible, 0.5 g. of calcium metal was added. When solution of the calcium was attained, 1.4 g. of "Cab-O-Sil" (Godfrey L. Cabot, Inc., 0.015–0.020 micron particle size silica, surface area [by nitrogen adsorption] of 175–200 square meters per gram) was floated on top of the alloy, then stirred into the molten mass. After stirring for 30 minutes, a finely divided, dense, metallic powder was obtained while the crucible temperature remained at 350° C., a temperature at which the cadmium-zinc-calcium alloy would ordinarily be fluid (melting point of 82.5% Cd, 17.5% Zn eutectic lies at 263° C.). The entire process was carried out in a dry-box under an argon atmosphere.

The dense, metallic powder obtained, which was stable in air, was then molded under a pressure of 20,000 p.s.i. at a temperature of 250° C. (well below the melting point of the alloy). A dense, metallic-appearing billet was obtained which was easily machined. Such a powder, containing silica uniformly dispersed, could thus be pressed into useful shapes which could be handled and machined by conventional metallurgical techniques.

*Example 9*

To a molten magnesium-indium alloy containing 0.3% magnesium and maintained at 190–225° C., "Cab-O-Sil" was wet into the molten alloy under 20 mm. oxygen partial pressure with rapid mechanical stirring in a closed system. One percent by weight of silica was thus introduced into the alloy with an accompanying 0.18% of oxygen corresponding to 2.8 monolayers of oxygen on the silica. This metal-oxide preparation was then used as a masterbatch and was subsequently diluted with lead to 1 volume percent silica in the alloy. After compaction and six hot extrusions at 200° C. of a 1 inch dia. slug through a ⅟₁₆ inch dia. hole, using a pressure of 25,000 p.s.i. the silica-filled lead had improved creep resistance and increased tensile strength. By using more or less of a similar masterbatch, containing 100 millimicron silica volume loadings of 0.1, 0.5 and 2.0 were made.

This application is a continuation-in-part of our copending application Serial No. 703,477, filed December 13, 1957, now abandoned, as a continuation-in-part of our then copending, now abandoned, application Serial No. 637,746, filed February 1, 1957, as a continuation-in-part of our then copending application Serial No. 595,770, filed July 3, 1956, and now abandoned, and is also a continuation-in-part of our copending application Serial No. 6,160, filed February 2, 1960, now abandoned, as a continuation-in-part of our said copending application Serial No. 703,477.

We claim:

1. In a process for producing an improved metalliferous composition, the steps comprising mixing a powdered solid dispersion of refractory metal oxide particles in an inactive metal with a molten mass of metal, said refractory oxide particles being substantially discrete, being insoluble in the resulting metal mixture, having an average dimension of 5 to 1000 millimicrons, and having a surface area, in square meters per gram, of from $6/D$ to $1200/D$, where D is the density of the refractory in grams per milliliter, there being present in the molten mass at least 4 mol percent, based on the weight of oxide particles, of an active metal, the intensity of mixing being sufficient to maintain dispersion of the oxide particles in a substantially discrete state in the mixture, the temperature of mixing being high enough to melt the inactive metal of the powdered solid dispersion, and the active metal being one having an oxide irreducible by hydrogen below 1000° C. and a free energy of formation at 27° C. above 88 kcal. per gram atom of oxygen, and thereafter casting the molten mixture.

2. A process of claim 1 in which the metalliferous composition has a melting point above 720° C. and the refractory oxide has a free energy of formation at 1000° C. greater than 90 kcal. per gram atom of oxygen.

3. A cast metalliferous composition comprising a dispersion, in a mixture of (a) a metal having an oxide reducible by hydrogen below 1000° C. and a free energy of formation at 27° C. below 88 kcal. per gram atom of oxygen, with (b) an active metal having an oxide irreducible by hydrogen below 1000° C. and a free energy of formation at 27° C. above 88 kcal. per gram atom of oxygen, of (c) substantially discrete particles, having an average dimension of 5 to 1000 millimicrons and a surface area, in square meters per gram, of $6/D$ to $1200/D$ where D is the density of the particles in grams per milliliter, of a refractory metal oxide which is insoluble in said metal mixture, is thermally stable at the melting point of the composition, and has a melting point above that of the composition and a free energy of formation ($\Delta F$) at 1000° C. above 60 kilocalories per gram atom of oxygen and above the $\Delta F$ of the oxide of the active metal, the proportion of active metal being at least 4 mol percent, based upon the weight of dispersed refractory oxide particles.

4. A composition of claim 3 in which the refractory oxide has a free energy of formation greater than 90 kcal. per gram atom of oxygen and the composition has a melting point above 720° C.

5. A composition of claim 3 in which the refractory oxide has an average particle size of 5 to 500 millimicrons.

6. A composition of claim 3 in which the proportion of refractory oxide is up to 10% by volume.

7. A composition of claim 3 in which the active metal is one having a melting point above 1200° C., the refractory oxide has a free energy of formation greater than 105 kcal. per gram atom of oxygen, and the composition has a melting point above 720° C.

8. A composition of claim 7 in which the active metal is titanium, the proportion of titanium being at least 50% by weight.

9. A composition of claim 7 in which the active metal is niobium, the proportion of niobium being at least 50% by weight.

10. A niobium base alloy of claim 9 containing from 2 to 20% by weight of molybdenum.

11. A niobium base alloy of claim 9 containing from 2 to 35% of tungsten.

12. A niobium base alloy of claim 9 in which the refractory oxide is thoria.

References Cited in the file of this patent

UNITED STATES PATENTS

| | | |
|---|---|---|
| 2,793,949 | Imich | May 28, 1957 |
| 2,798,808 | Iredell et al. | July 9, 1957 |
| 2,823,988 | Grant et al. | Feb. 18, 1958 |
| 2,949,358 | Alexander et al. | Aug. 16, 1960 |
| 2,972,529 | Alexander et al. | Feb. 21, 1961 |